Aug. 8, 1950     B. L. WALKER     2,517,947
LAWN MOWER SHARPENER
Filed June 11, 1947     2 Sheets-Sheet 2
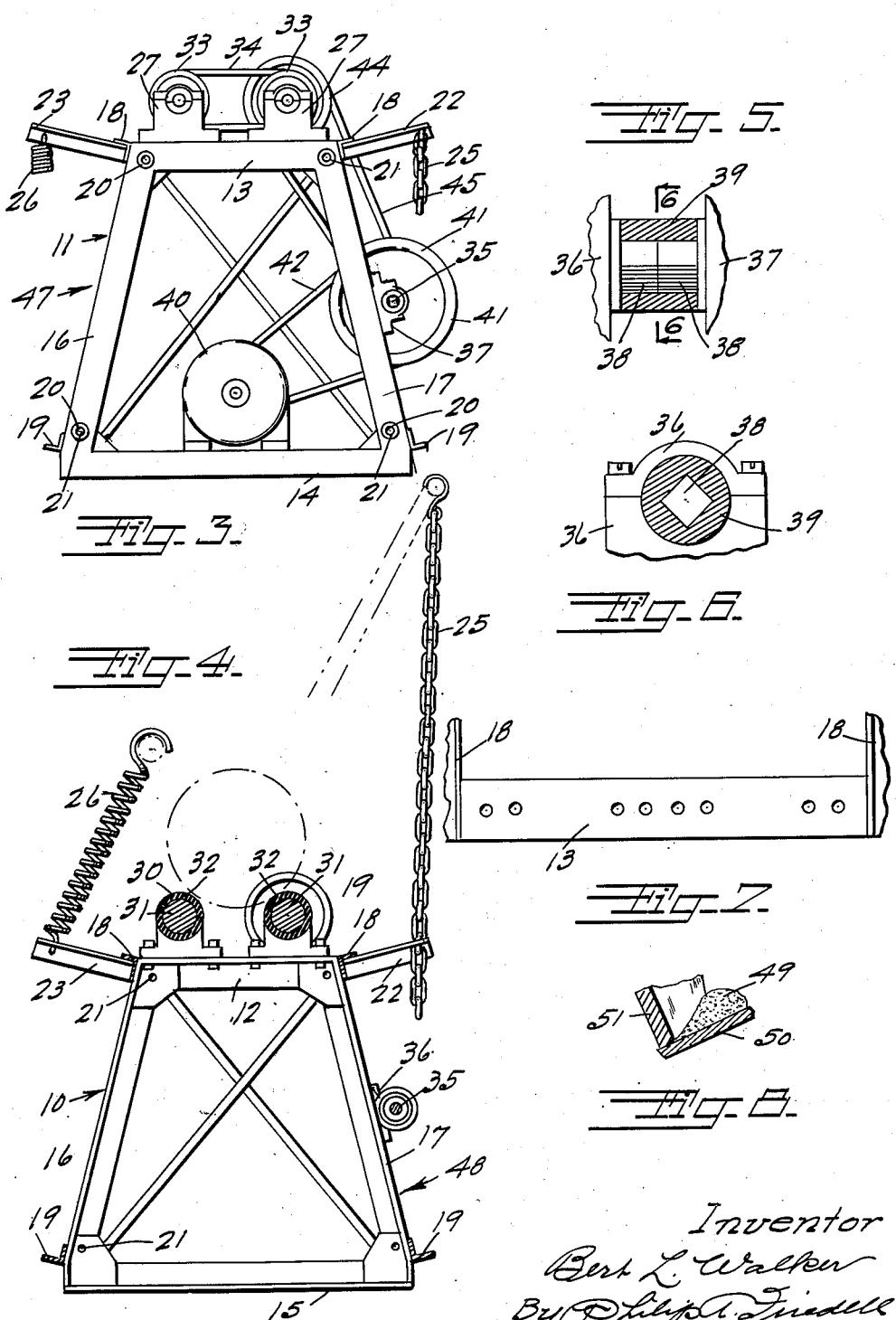
Inventor
Bert L. Walker
By Philip A. Tiedell
Attorney Patented Aug. 8, 1950

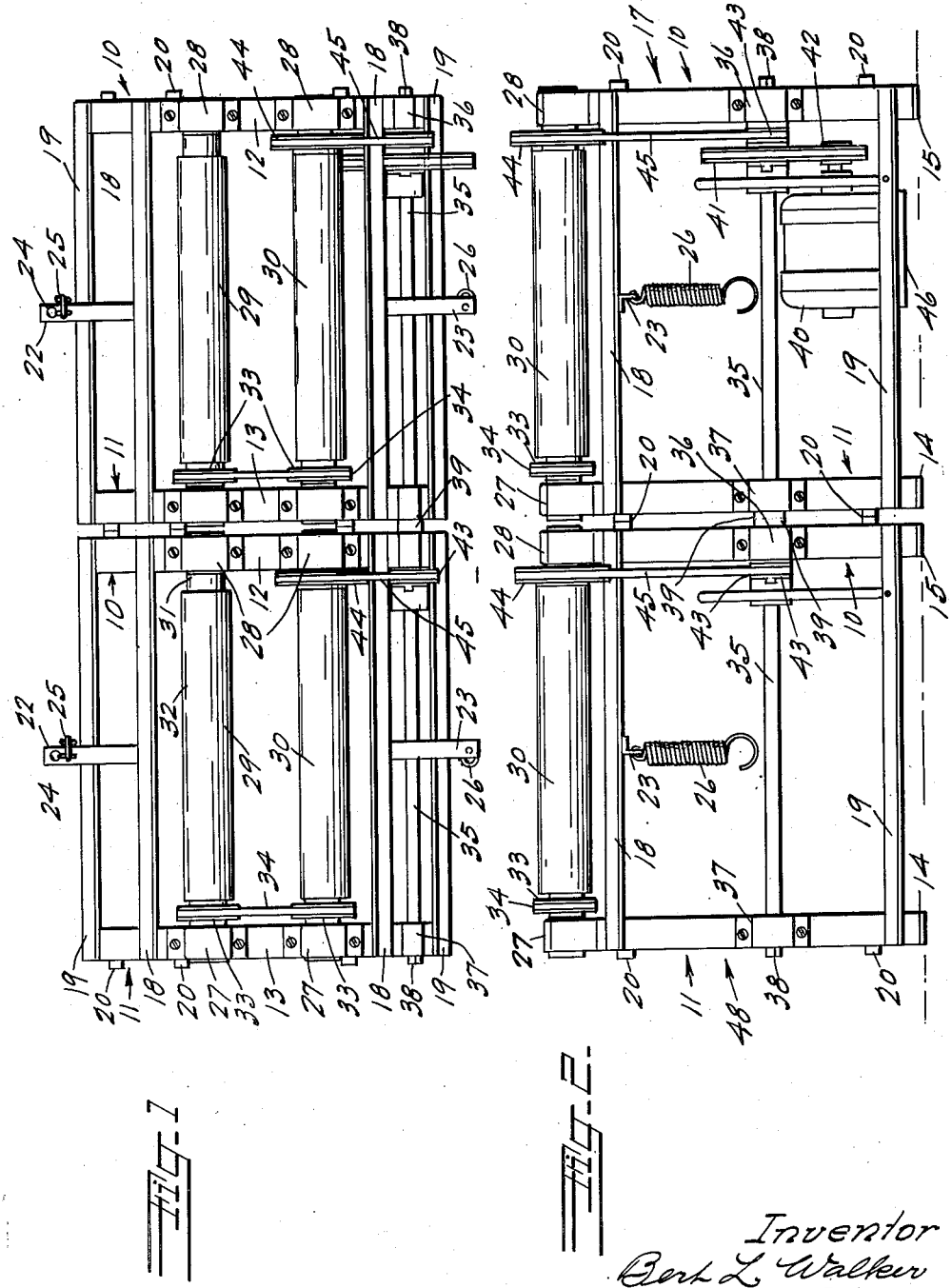

2,517,947

UNITED STATES PATENT OFFICE 2,517,947

LAWN MOWER SHARPENER

Bert L. Walker, Petaluma, Calif.

Application June 11, 1947, Serial No. 753,846

5 Claims. (Cl. 51—26)

This invention relates to improvements in lawn mower sharpeners, and provides a new and improved machine which simultaneously sharpens the stationary cutter blade and the reel or rotatable blades of lawn mowers and the like.

The machine is manufactured in units with each unit adapted to sharpen one lawn mower at a time, and with the units made to couple together in perfect alignment so that a single machine can be assembled of any number of units, the units simply being bolted together, with slip couplings being used to couple the drive shafts of the respective units together to form a continuous drive shaft.

The sharpening or grinding medium consists of a grinding compound in oil placed on the stationary cutter blade, with the cutter blade slightly inclined to slowly feed the grinding material forward while the machine drives the reel backward through the medium of the lawn mower wheel dogs which are reversed for the grinding operation.

Although it is preferred to make the machine in separable units so that units can be added to handle any number of lawn mowers simultaneously on a single machine, a single unit can be made of any desired length to handle a number of lawn mowers, the advantage of the multiple unit type residing in the possibility of increasing the capacity of the machine at any time, and of supplying machines with any desired capacity.

The objects and advantages of the invention are as follows:

First, to provide a lawn mower sharpener in which the lawn mower is driven in reverse and the grinding compound is self-feeding and consists of a semi-fluid grinding compound supported on the stationary cutter blade of the lawn mower.

Second, to provide a grinding machine as outlined which is constructed in separable units so that the capacity of the machine can be increased or decreased at will.

Third, to provide a machine as outlined which will positively drive the wheels of the lawn mower to drive the cutter reel for grinding in cooperation with the cutter blade and a grinding compound.

Fourth, to provide a machine which will perfectly sharpen a lawn mower without disassembling the mower.

Fifth, to provide a machine as outlined which, irrespective of the capacity of the machine, can be operated by one operator.

Sixth, to provide a special mixture of grinding compound and oil to be applied to the stationary cutter blade for simultaneously grinding the reel blades and the stationary blade, and which compound is of a semi-fluid consistency to slowly feed down the inclined surface of the stationary cutter blade, and which compound will simultaneously minimize heating of the cutting edges assisted by the fan effect of the rotating reel.

In describing the invention reference will be made to the accompanying drawings, in which:

Fig. 1 is a top plan view of the invention showing two units assembled into a single machine.

Fig. 2 is a front elevation of Fig. 1.

Fig. 3 is an end elevation of Fig. 2, showing the drive unit.

Fig. 4 is a sectional elevation through one unit showing a lawn mower in position for sharpening.

Fig. 5 is a longitudinal section through the sleeve coupling for the drive shaft for connecting the drive shafts of the respective units together to form a continuous shaft to be driven by a single source of power for all of the units comprising a single machine.

Fig. 6 is a section taken on line 6—6 of Fig. 5.

Fig. 7 shows one of the bearing supports for the drive roller bearings, to permit adjustment of the drive rollers for lawn mower wheels of different diameters.

Fig. 8 shows the method of feeding the grinding compound.

Each unit of the machine includes a complete frame including the end supports 10 and 11 shown as formed of structural shapes such as angles and including bearing supports 12 and 13, bases 14 and 15 and legs 16 and 17, and longitudinal members 18 and 19 all tied together into a rigid structure and suitably braced, the end supports each having a plurality of bosses or spacers 20 provided with accurately reamed holes 21 for dowel-type bolts for bolting the units together in accurate alignment.

Hold-down brackets 22 and 23 project outwardly as shown and are anchored to the top stringers 18, the brackets on one side of the machine having each a locking passage 24 for a chain 25, and those on the other side being each provided with tensioning means such as a spring 26, the passage for the chain being substantially keyhole-shaped so that the chain will pass through the enlarged portion of the passage and will lock in the slot portion.

Mounted on the bearing support members 12 and 13 are bearings 27 and 28 which are adjustable as to center distance as indicated in Fig. 7, and supported in the bearings are two rollers 29 and 30 each of which consists of a metal or other rigid core 31 and friction sleeve 32 which may consist of a covering of rubber or other suitable friction material or of a length of steam hose or the like, and the rollers on each unit are driven in the same direction and at the same speed through the sheaves 33 and belt 34.

A drive shaft 35 is provided for each unit and is mounted in bearings 36 and 37 and terminates in a coupling end 38 at each end with the coupling end projecting a distance equal to the projection of the bosses 20, and a coupling sleeve 39 is provided for each unit, so that the drive shafts of the respective units of a machine can be coupled into a continuous drive shaft to be driven by a prime mover on one of the units such as the motor 40 driving a sheave 41 mounted on the drive shaft, through a belt 42. The continuous coupled drive shaft drives the rollers of the respective units through individual sheaves 43 and 44 and belts 45, the motor being mounted on a plate 46 spanning the stringers 19. The first unit includes the prime mover and drive while the remaining units are arranged to couple thereto, thus simplifying the shipping and assembling of machines of any desired number of units.

The initial or basic unit is indicated at 47 and is identical to additional units 48 except that it includes the prime mover or driving means for the drive shaft. This unit forms a complete machine for sharpening one lawn mower at a time, though it could be extended in length to take several lawn mowers simultaneously. However the preferred form is as shown in which additional units are coupled to the basic unit by merely bolting the next unit to the basic unit and before bolting placing the slip coupling 39 over the squared ends 38 of the adjoining ends of the shafts, the placing of the slip couplings and the bolting together being all that is necessary to complete assembly of a multi-unit machine.

When a lawn mower is to be sharpened, the right wheel of the mower is removed, the driving dog is reversed so as to reverse the direction of driving of the cutter reel, the stationary cutter or cutting bar is adjusted to where is contacts the cutting reel and the right wheel is replaced. The mower is placed on the machine with the mower wheels riding on the spaced rollers, the chain 25 is hooked over the handle or some other suitable part of the lawn mower, and the spring 26 is hooked over the trailing roller on the lawn mower. A mixture of grinding compound and oil 49 is applied to the cutting bar 50, and the machine is placed in operation, the motor 40 driving the drive shaft and thence the nearest roller, with the other roller driven through the sheaves 33 and belt 34, these rollers driving the wheels on the lawn mower and the cutter reel in reverse and the cutter reel blades 51 grinding against the cutting bar 50 with the grinding compound 49 slowly feeding by gravity to the line of contact between the stationary blade and the rotating blades.

This assures cutting edges which cooperate throughout their lengths providing highly efficient cutting edges, unlike stoned edges which cooperate at some points and not at others. Obviously, the machine will handle manually operable as also power operable lawn mowers, and other devices which include a rotatable blade assembly cooperative with a stationary blade.

I claim:

1. A lawn mower sharpener having a spaced pair of rollers for support and driving of the wheels of a lawn mower, and a frame for support of the rollers; a flexible, non-elastic member having one end attached to the rear of the frame and means at the other end for securing to the handle of the lawn mower and being adjustable as to length, and a tension spring having one end attached to the front of the frame and having attaching means at the other end for attachment to the trailer roller on the lawn mower for resilient and uniform urgence of said wheels against said rollers and to compensate for unevenness in wheels or rollers; said non-elastic member governing the relative position of the lawn mower and controlling the tension on said spring for most efficient driving of the wheels and sharpening of the lawn mower.

2. A lawn mower sharpener comprising; a frame including front, back, and side members, and legs for said frame, and means for coupling a plurality of said frames in series; two spaced bearings on each side member and spaced parallel rollers rotatably supported thereby, and a sheave interposed between one end of each roller and its adjacent bearing, and a flexible V-belt operating over said sheaves for driving both rollers in the same direction, and a driven sheave interposed between the other end of one roller and its other bearing, a drive shaft, and a drive sheave mounted below said frame on said drive shaft, and a belt operating over said driven and drive shaft, and means for driving said drive sheave, said rollers having their axes in the same horizontal plane and spaced to engage the wheels of a lawn mower at two points spaced substantially 45° apart on the wheels, said bearings being relatively adjustable on said side members as to spacing to adjust the spacing between the rollers to accommodate lawn mower wheels of different diameters, and said drive shaft having coupling extensions at the respective ends and coupling means therefor for coupling to a drive shaft of a second machine in series to be driven by the said means for driving through said coupling means.

3. A structure as defined in claim 2, a chain having one end adjustable on said frame and having a hook at the other end for attachment to the handle of a lawn mower, and a tension spring having one end secured to said frame and having a hook at the other end to hook over the trailer roller of the lawn mower, said chain and spring cooperating to cause resilient and uniform urgence of the wheels against the rollers to compensate for unevenness of the wheels or rollers and for wear on the rollers for efficient operation of the lawn mower for sharpening, and said chain providing for most efficient positioning of the lawn mower and for governing the urgence of the spring.

4. A lawn mower sharpener having a pair of spaced parallel rollers for supporting and driving the wheels of a lawn mower for sharpening, and a support for said rollers; a flexible non-elastic member having means at one end for attachment to the handle of the lawn mower and having the other end adjustable on said support; and a tension spring having one end attached to said support and having means at the other end for attachment to the trailer wheel of the lawn mower, with said spring maintaining uniform urgence of said wheels against the rollers irrespective of wear on the rollers or irregularities on the surfaces of the wheels or rollers, and said flexible non-elastic member maintaining the position of the lawn mower and through adjustment on said support controlling the tension of said spring.

5. A structure as defined in claim 4; said flexible non-elastic member comprising a link chain, and said support having an elongated slot for securing the chain link by link; said means at one end and said means at the other end each comprising a hook to respectively hook over the handle and over the trailer wheel, for quick attachment.

BERT L. WALKER.

REFERENCES CITED

The following references are of record in the file of this patent:

UNITED STATES PATENTS

| Number | Name | Date |
| --- | --- | --- |
| 1,383,091 | Fernside | June 28, 1921 |
| 1,484,708 | Crassman | Feb. 26, 1924 |
| 1,513,276 | Royer | Oct. 28, 1924 |
| 1,612,219 | Powers | Dec. 28, 1926 |
| 1,790,471 | Hardinge | Jan. 27, 1931 |
| 1,807,934 | Ross | June 2, 1931 |
| 2,174,204 | Dunn | Sept. 26, 1939 |